United States Patent Office 3,212,975
Patented Oct. 19, 1965

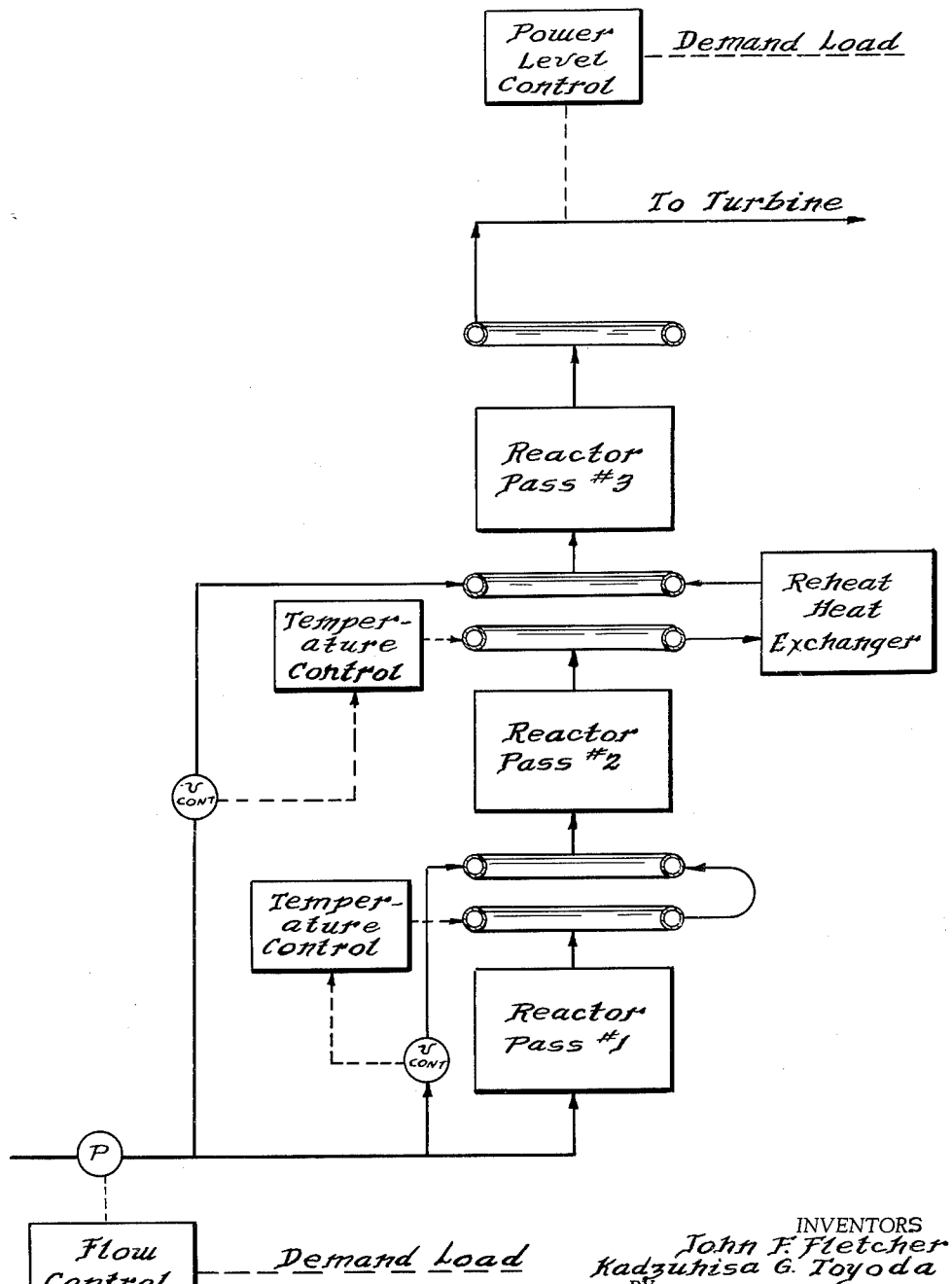

3,212,975
METHOD OF CONTROLLING A NUCLEAR REACTOR
John F. Fletcher, Kennewick, and Kadzuhisa G. Toyoda, Pasco, Wash., assignors to the United States of America as represented by the United States Atomic Energy Commission
Filed Oct. 26, 1964, Ser. No. 406,638
2 Claims. (Cl. 176—20)

This invention relates to a method of controlling a nuclear reactor. In more detail the invention relates to a method of controlling the temperature within a nuclear reactor wherein the coolant traverses the reactor core in a plurality of passes.

Whereas the temperature of the coolant leaving a nuclear reactor after makinng its final pass through the reactor can be controlled by varying the power level of the reactor, control of the temperature of a single coolant pass is not so simple. This follows because any adjustment of the power level of the reactor affects the temperature in all coolant passes and not the last coolant pass only.

A fast, supercritical pressure, power reactor such as the reactor described in patent application S.N. 316,783 filed October 16, 1963, in the names of Russell E. Peterson and Samuel L. Stewart, now Patent No. 3,140,237 granted July 7, 1964, is particularly sensitive to temperature variations therein. For example, temperature variations result in changes in coolant density and may, if large enough, result in thermal shock and unallowable stresses in piping and equipment. Therefore, the temperature of the reactor must be held essentially uniform within designated limits during operation of the reactor. Since the coolant makes a number of passes through this reactor, it is not possible to individually adjust the temperature within each coolant pass by varying the power level.

It is accordingly the object of the present invention to develop a method of controlling the temperature individually in each of a plurality of coolant passes through a nuclear reactor.

This and other objects of the present invention are attained by bypassing a portion of the coolant from the inlet of the reactor to the inlet of each coolant pass, monitoring the temperature of the coolant from each pass, and adjusting the flow of coolant through each bypass line inversely with respect to variations in the temperature of the coolant coming from the last pass bypassed while maintaining the power level of the reactor constant. Since the total flow of coolant through a reactor is constant at a constant power level, this procedure raises the coolant flow through a pass which is running hot and lowers the coolant flow through a pass which is running cool.

The invention will next be described in connection with the accompanying drawing wherein the single figure consists of a flow sheet illustrating the method.

Although the invention is not restricted thereto, the invention will be described as applied to a supercritical pressure power reactor such as that described in the above-mentioned patent application S.N. 316,783.

In the drawing preheated and pressurized water enters the first pass of the reactor at 540° F. and about 4500 p.s.i.g. The fluid temperature is raised to 804° F. in the first pass and to 1050° F. in the second pass. Following the second pass, the supercritical pressure fluid flows to reheat heat exchangers where heat is transferred to both the exhaust steam of the high pressure and the first reheat units of the turbine. The regenerative heating raises the reheat steam temperature to 1000° F. and reduces the supercritical pressure fluid temperature to 814° F., which fluid is heated to 1050° F. in the third pass.

Separate bypass lines are provided leading from the inlet line to the inlet headers of the second and third passes. Feed water is sprayed into these headers using conventional spray attemperation techniques. The flow rate through each of these bypass lines is controlled by the outlet coolant temperature of the coolant coming from the reactor pass bypassed.

For example, if the outlet coolant temperature from pass No. 1 should increase above 804° F., the bypass flow of feed water into pass No. 2 would be reduced. Since total flow is constant for a given plant power output, a greater flow rate through pass No. 1 results, lowering the outlet temperature to the desired value. The temperature of the fluid entering reactor pass No. 2 is therefore reduced by reducing the flow rate of relatively cool bypass feed water to this reactor pass. Similarly, temperature variations in pass No. 2 will vary the bypass flow to pass No. 3, changing the flow through passes Nos. 1 and 2 to correct the pass 2 outlet temperature. The invention can, of course, be applied to reactors incorporating more than three reactor passes.

The temperature regulation attainable by this method is limited, and is intended primarily to compensate for changes in power distribution expected during the useful life of the reactor core. Temperature changes beyond the corrective capacity of the method would require a reduction of reactor power level.

It will be understood that the invention is not to be limited to the details given herein but that it may be modified within the scope of the appended claims.

What is claimed is:
1. A method of controlling the temperature within a nuclear reactor in which coolant traverses the reactor core in a plurality of passes, comprising monitoring the outlet temperature of the coolant from each pass, bypassing a portion of the coolant flow from the reactor inlet line to the inlet of each coolant pass, and adjusting the flow through the bypass lines inversely with respect to variations in the outlet temperature of the last pass bypassed while maintaining total flow of coolant through the reactor constant.

2. A method of controlling the temperature within a fast, supercritical pressure power reactor in which water traverses the reactor core in three passes, comprising monitoring the outlet temperature of water from each pass, bypassing a part of the feed water flow directly to the inlet of the second and third coolant passes, and adjusting the flow thus bypassed inversely with respect to variations in the outlet temperature of the last pass bypassed while maintaining the total flow of water through the reactor constant.

References Cited by the Examiner
UNITED STATES PATENTS

| | | | |
|---|---|---|---|
| 3,140,237 | 7/64 | Peterson et al. | 176—61 X |
| 3,156,625 | 11/64 | Harty et al. | 176—61 X |
| 3,174,907 | 3/65 | Bradley | 176—20 |

References Cited by the Applicant
Steam, Its Generation and Use, (c) 1955, p. 13–6ff, Babcock and Wilcox.

CARL D. QUARFORTH, *Primary Examiner.*